United States Patent
Inoue et al.

(10) Patent No.: US 7,554,593 B2
(45) Date of Patent: Jun. 30, 2009

(54) SOLID STATE IMAGING DEVICE

(75) Inventors: Masahiro Inoue, Kanagawa (JP); Isao Hirota, Kanagawa (JP); Yuichiro Shiraishi, Fukuoka (JP); Norihiko Yoshimura, Fukuoka (JP)

(73) Assignee: Sony Corporation, Tokyo (JP)

( * ) Notice: Subject to any disclaimer, the term of this patent is extended or adjusted under 35 U.S.C. 154(b) by 467 days.

(21) Appl. No.: 11/380,461

(22) Filed: Apr. 27, 2006

(65) Prior Publication Data

US 2006/0274178 A1    Dec. 7, 2006

(30) Foreign Application Priority Data

Apr. 28, 2005    (JP) .......................... P2005-133415

(51) Int. Cl.
*H04N 3/14* (2006.01)
(52) U.S. Cl. ........................... 348/311; 348/303
(58) Field of Classification Search ................ 348/302, 348/303, 311, 312
See application file for complete search history.

(56) References Cited

U.S. PATENT DOCUMENTS

| | | | | |
|---|---|---|---|---|
| 4,996,600 A | * | 2/1991 | Nishida et al. | 348/322 |
| 7,002,630 B1 | * | 2/2006 | Iizuka | 348/322 |
| 2002/0039144 A1 | | 4/2002 | Yamada | |
| 2005/0117043 A1 | * | 6/2005 | Fujii et al. | 348/311 |
| 2005/0138610 A1 | * | 6/2005 | Terunuma | 717/140 |
| 2005/0225657 A1 | * | 10/2005 | Kobayashi | 348/311 |
| 2006/0092304 A1 | * | 5/2006 | Hirota | 348/311 |

FOREIGN PATENT DOCUMENTS

| | | |
|---|---|---|
| JP | 01-309579 | 12/1989 |
| JP | 2002-112122 | 4/2002 |

* cited by examiner

*Primary Examiner*—Timothy J Henn
(74) *Attorney, Agent, or Firm*—Sonnenschein Nath & Rosenthal LLP

(57) ABSTRACT

A solid state imaging device including a plurality of photo diodes disposed in a matrix shape, a vertical transfer unit disposed along each vertical column of the photo diodes, and a horizontal transfer unit in which a predetermined number, two or more, of adjacent vertical transfer units are used as one group to correspond to a unit transfer bit, wherein at least one charge transfer unit corresponding to each group of the vertical transfer unit is provided for each group.

4 Claims, 10 Drawing Sheets

SOLID STATE IMAGING DEVICE

CROSS-REFERENCE TO RELATED APPLICATIONS

The present application claims priority to Japanese Patent application JP 2005-133415, filed Apr. 28, 2005, the entire contents of which are incorporated herein by reference to the extent permitted by law.

BACKGROUND OF THE INVENTION

1. Field of the Invention

The present invention relates to a solid state imaging device, and more particularly to a solid state imaging device to be used for a digital still camera, a video camera or the like.

2. Description of Related Art

In a solid state imaging device, signal charges accumulated in an imaging area are picked up as electric signals from an output unit via vertical transfer units and a horizontal transfer unit, and the picked-up electric signals are recorded in a video apparatus or directly transferred to a television or the like positioned at a reception side to be reproduced.

For a solid state imaging device in a related art adopting a charge transfer method of an interlace scan-interline transfer (IS-IT) type, a technique of thinning pixels in a vertical direction has been proposed in order to improve a read speed (hereinafter called a frame rate). In one example of pixel thinning, in order to realize a frame rate of 30 frames/sec in a solid state imaging device whose frame rate for outputting all pixels of 1280×960 is 7.5 frames/sec, only one pixel among four pixels in the vertical direction is read, i.e., compression is performed at a compression ratio of ¼ which is a ratio of reading pixels in the vertical direction, to thereby improve the frame rate.

Figure 6:
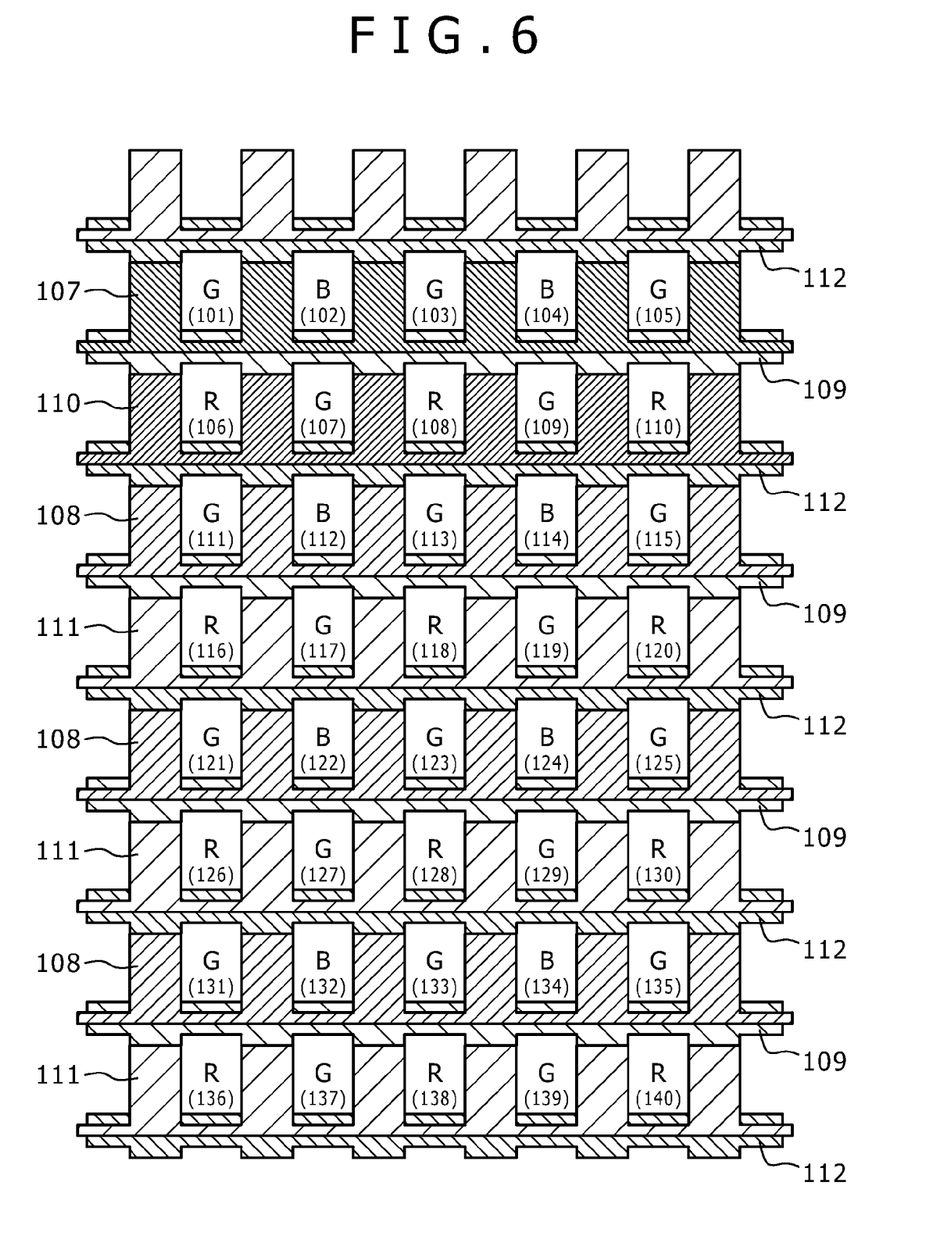
FIG. 6 is a schematic diagram showing an electrode structure illustrating thinning of pixels in a vertical direction.
Figure 7:
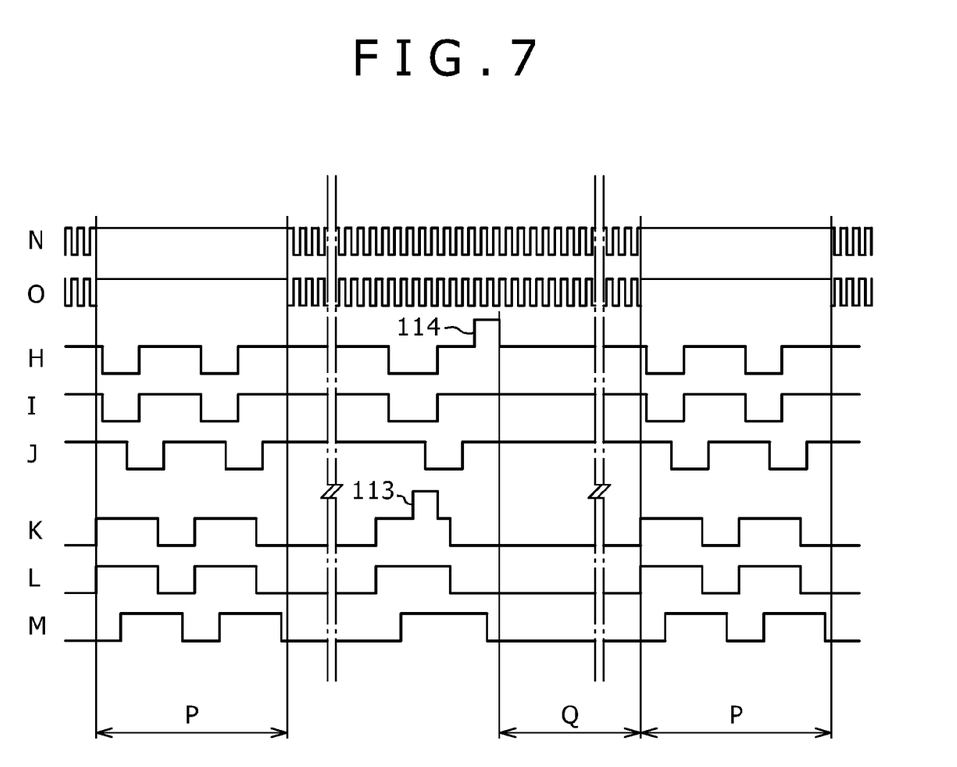
FIG. 7 is a schematic diagram illustrating an operation timing of each pulse.
Figure 8:
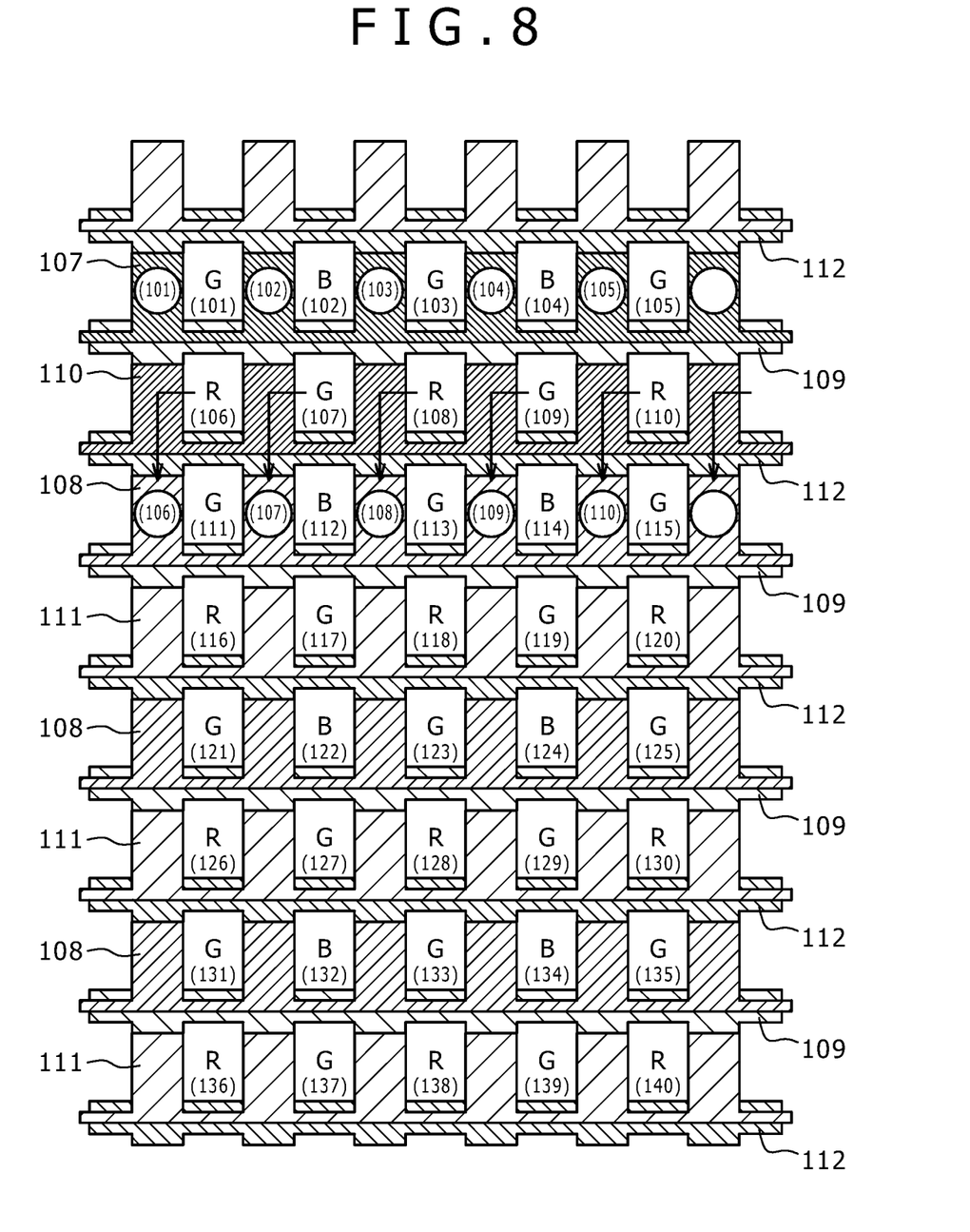
FIG. 8 is a schematic diagram showing the position of signal charges read at a timing indicated by a symbol Q in FIG. 6.

FIG. 6 is a schematic diagram of an electrode structure illustrating pixel thinning in the vertical direction. A drive pulse indicated by a symbol H in FIG. 7 is applied to a vertical electrode 107, a drive pulse indicated by a symbol I in FIG. 7 is applied to a vertical electrode 108, a drive pulse indicated by a symbol J in FIG. 7 is applied to a vertical electrode (2) 109, a drive pulse indicated by a symbol K in FIG. 7 is applied to a vertical electrode 110, a drive pulse indicated by a symbol L in FIG. 7 is applied to a vertical electrode 111, and a drive pulse indicated by a symbol M in FIG. 7 is applied to a vertical electrode (4) 112. In this manner, as shown in FIG. 8, signal charges accumulated in photo diodes indicated by reference numerals 101 to 110 among photo diodes 101 to 140 are read to vertical transfer units and the read charges are transferred from the vertical transfer units to a horizontal transfer unit. Specifically, signal charges accumulated in the photo diodes indicated by reference numerals 106 to 110 are read to the vertical transfer units, by applying a read voltage, i.e., a read voltage (1) 113 for reading signal charges accumulated in the photo diodes to the vertical transfer units, to a drive pulse, i.e., a vertical transfer clock pulse indicated by the symbol K in FIG. 7 among the drive pulses for driving the vertical transfer units indicated by the symbols H, I, J, K, L and M. The read charges are transferred by two lines by the vertical transfer clock pulses. Thereafter, signal charges accumulated in the photo diodes indicated by the symbols 101 to 105 are read to the vertical transfer units, by applying a read voltage (2) 114 to the vertical transfer clock pulse indicated by the symbol H in FIG. 7. The signal charges accumulated in the photodiodes indicated by reference numerals 101 to 110 and read to the vertical transfer units are sequentially transferred to the horizontal transfer unit by the vertical transfer clock pulses. The charges transferred to the horizontal transfer unit are sequentially transferred from the horizontal transfer unit to the output unit by horizontal transfer clock pulses indicated by symbols N and O in FIG. 7, to be output from the output unit and realize compression in the vertical direction at a compression ratio of ¼. In FIG. 6, "G", "R" and "B" symbols represent "green", "red" and "blue" of color filers, respectively, and a symbol P in FIG. 7 represents a horizontal blanking interval. FIG. 8 shows the positions of signal charges read at a timing indicated by a symbol Q in FIG. 7.

Although compression in the vertical direction can be performed in the manner described above, compression in the horizontal direction is difficult. Therefore, for example, as pixels of 1280×960 are compressed in the vertical direction at a compression ratio of ¼, pixels of 1280×240 are output from the output unit. An aspect ratio for TV cannot be maintained, so that a balance between vertical and horizontal directions is degraded. There arises therefore a fact of a necessity of maintaining an aspect ratio of 4:3 by performing compression at a compression ratio of ¼ in a post process.

In order to address this fact, a technique (for example, refer to Japanese Patent Application Publication No. 2002-112122) has been proposed. In the technique, a predetermined number, two or more, of adjacent vertical transfer units are collectively used as one group, each group is made in one-to-one correspondence with a unit transfer bit of the horizontal transfer unit, and charges are transferred from the vertical transfer unit to the unit transfer bit (hereinafter called a corresponding unit transfer bit) of the horizontal transfer unit corresponding to the group to which the vertical transfer unit belongs, to thereby conduct compression in the horizontal transfer unit in the horizontal direction.

SUMMARY OF THE INVENTION

However, in the case of using as one group a predetermined number, two or more, of adjacent vertical transfer units, making each group in one-to-one correspondence with a unit transfer bit of the horizontal transfer unit, and transferring charges from the vertical transfer unit to the unit transfer bit, transfer control of charges from the vertical transfer unit to the corresponding unit transfer bit may become insufficient, because the positional relation is different between each vertical transfer unit and the corresponding unit transfer bit, although the transfer destination of charges in each vertical transfer unit in the same group is identical. This insufficient transfer control is to be improved.

By using a specific example, description will be made on the insufficient charge transfer control in the case where a predetermined number, two or more, of adjacent vertical transfer units are collectively used as one group, and each group is made in one-to-one correspondence with a unit transfer bit of the horizontal transfer unit, and then charges are transferred from the vertical transfer unit to the corresponding unit transfer bit. In the following description, it is assumed that charges are transferred from the vertical transfer unit to the electrode of the horizontal transfer unit to which a horizontal transfer unit drive pulse H1 is applied.

Figure 9A:
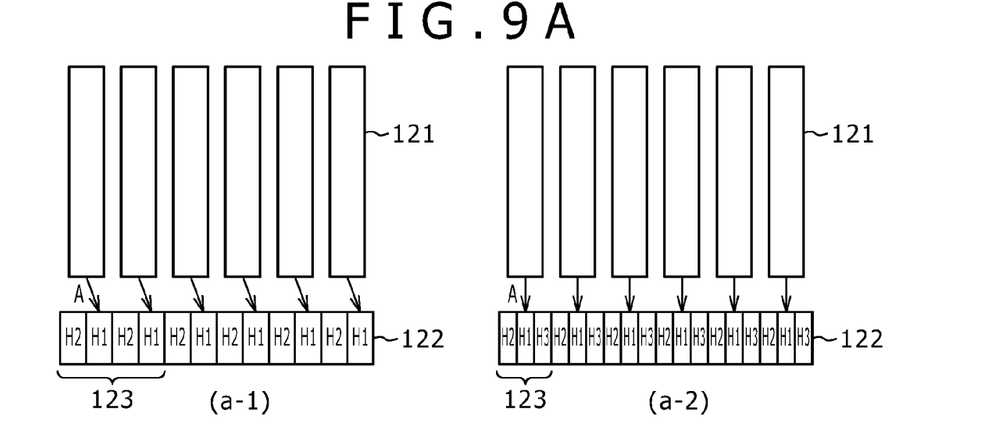
FIGS. 9A to 9C are schematic diagrams illustrating transfer directions of signal charges.

FIG. 9A (a-1) illustrates two-phase drive in which the horizontal transfer unit is driven by applying horizontal transfer unit drive pulses H1 and H2, and FIG. 9A (a-2) illustrates three-phase drive in which the horizontal transfer unit is driven by applying horizontal transfer unit drive pulses H1, H2 and H3. As shown, if a single vertical transfer unit 121 is made in one-to-one correspondence with a unit transfer bit 123 of a horizontal transfer unit 122, each vertical transfer unit has the same positional relation to the unit transfer bit as the charge transfer destination and can transfer charges to the corresponding unit transfer bit in the same direction (direction indicated by a symbol A in FIG. 9A). It is therefore possible to realize sufficient transfer control of charges from the vertical transfer unit to the corresponding unit transfer bit.

Figure 9B:
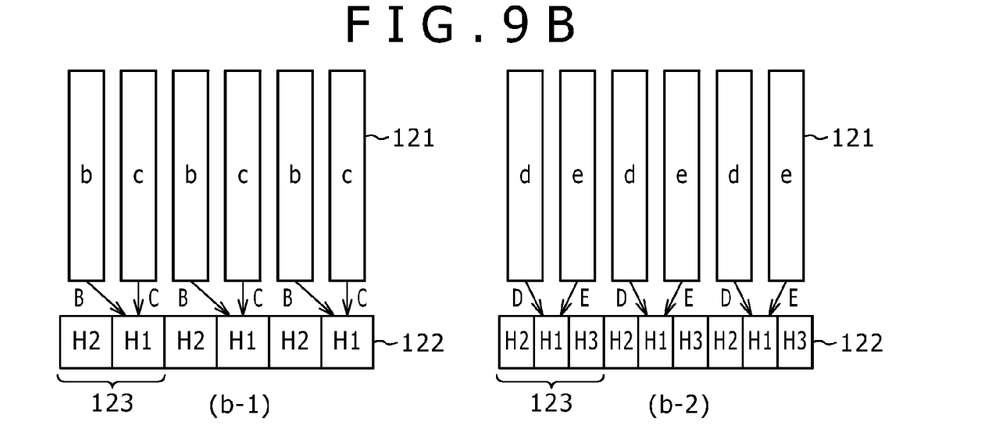
Figure 9C:
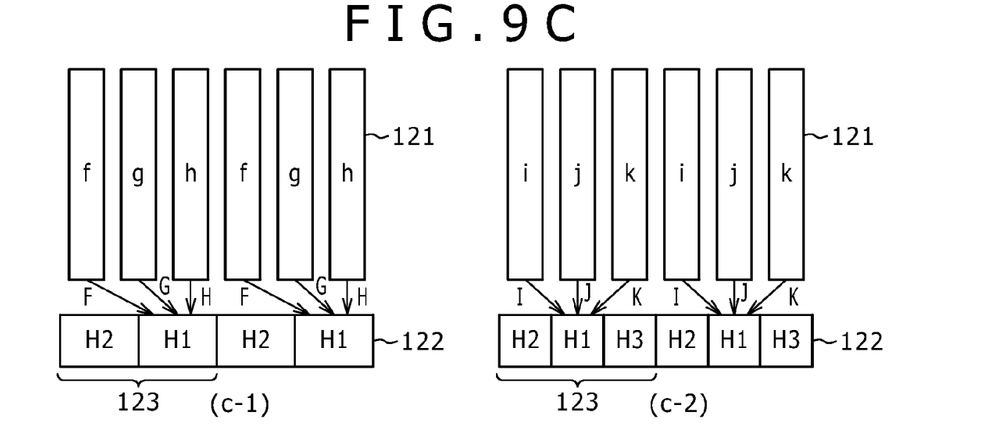

FIG. 9B (b-1) illustrates two-phase drive in which the horizontal transfer unit is driven by applying horizontal transfer unit drive pulses H1 and H2, and FIG. 9B (b-2) illustrates three-phase drive in which the horizontal transfer unit is driven by applying horizontal transfer unit drive pulses H1, H2 and H3. In FIGS. 9B (b-1) and 9B (b-2), two adjacent vertical transfer units are used as one group and one group is made in one-to-one correspondence with a unit transfer bit of a horizontal transfer unit. FIG. 9C (c-1) illustrates two-phase drive in which the horizontal transfer unit is driven by applying horizontal transfer unit drive pulses H1 and H2, and FIG. 9C (c-2) illustrates three-phase drive in which the horizontal transfer unit is driven by applying horizontal transfer unit drive pulses H1, H2 and H3. In FIGS. 9C (c-1) and 9C (c-2), three adjacent vertical transfer units are used as one group and one group is made in one-to-one correspondence with a unit transfer bit of a horizontal transfer unit. In contrast with the case shown in FIG. 9A, in these cases shown in FIGS. 9B and 9C, the positional relation to the unit transfer bit as the charge transfer destination becomes different for each vertical transfer unit, and charges are transferred to the corresponding unit transfer bit in a different direction for each vertical transfer unit. It is therefore difficult to realize sufficient transfer control of charges from the vertical transfer unit to the corresponding unit transfer bit.

More specifically, in the case (shown in FIG. 9B (b-1)) in which two adjacent vertical transfer units are used as one group and the horizontal transfer unit is driven by two-phase drive, the vertical transfer unit indicated by a symbol b transfers charges to the corresponding unit transfer bit in a direction indicated by a symbol B, whereas the vertical transfer unit indicated by a symbol c transfers charges to the corresponding unit transfer bit in a direction indicated by a symbol C. Accordingly, charge transfer directions to the corresponding unit transfer bit differ depending on the vertical transfer units in the same group. It is possible to realize a simple layout for performing direct transfer of charges from the vertical transfer unit to the corresponding unit transfer bit.

Further, in the case (shown in FIG. 9B (b-2)) in which two adjacent vertical transfer units are used as one group and the horizontal transfer unit is driven by three-phase drive, the vertical transfer unit indicated by a symbol d transfers charges to the corresponding unit transfer bit in a direction indicated by a symbol D, whereas the vertical transfer unit indicated by a symbol e transfers charges to the corresponding unit transfer bit in a direction indicated by a symbol E. Accordingly, charge transfer directions to the corresponding unit transfer bit differ depending on the vertical transfer units in the same group, so that it is difficult to realize direct transfer of charges from the vertical transfer unit to the corresponding unit transfer bit. For that reason, it is need to reconsider the layout of transfer path.

Still further, in the case (shown in FIG. 8C (c-1)) in which three adjacent vertical transfer units are used as one group and the horizontal transfer unit is driven by two-phase drive, the vertical transfer unit indicated by a symbol f transfers charges to the corresponding unit transfer bit in a direction indicated by a symbol F, the vertical transfer unit indicated by a symbol g transfers charges to the corresponding unit transfer bit in a direction indicated by a symbol G, and the vertical transfer unit indicated by a symbol h transfers charges to the corresponding unit transfer bit in a direction indicated by a symbol H. Accordingly, charge transfer directions to the corresponding unit transfer bit differ depending on the vertical transfer units in the same group, so that it is difficult to realize direct transfer of charges from the vertical transfer unit to the corresponding unit transfer bit. For that reason, it is need to reconsider the layout of transfer path.

Still further, in the case (shown in FIG. 9C (c-2)) in which three adjacent vertical transfer units are used as one group and the horizontal transfer unit is driven by three-phase drive, the vertical transfer unit indicated by a symbol i transfers charges to the corresponding unit transfer bit in a direction indicated by a symbol I, the vertical transfer unit indicated by a symbol j transfers charges to the corresponding unit transfer bit in a direction indicated by a symbol J, and the vertical transfer unit indicated by a symbol k transfers charges to the corresponding unit transfer bit in a direction indicated by a symbol K. Accordingly, charge transfer directions to the corresponding unit transfer bit differ depending on the vertical transfer units in the same group, so that it is difficult to realize direct transfer of charges from the vertical transfer unit to the corresponding unit transfer bit. For that reason, it is need to reconsider the layout of transfer path.

The present invention has been made by considering these circumstances. According to an embodiment of the present invention, there is provided a solid state imaging device which realizes compression in a horizontal direction in a horizontal transfer unit and has a layout of transfer path capable of transferring charge easily from the vertical transfer units to the horizontal transfer unit.

The present invention is provided a solid state imaging device having: an image pickup unit including a plurality of photo diodes disposed in a matrix shape and a vertical transfer unit disposed along each vertical column of the photo diodes for transferring charges from each photo diode; and a horizontal transfer unit for transferring charges from the vertical transfer units in a horizontal direction, and making a predetermined number, two or more, of adjacent vertical transfer units being used as one group correspond to a unit transfer bit of the horizontal transfer unit, and transferring charges from the vertical transfer unit to the unit transfer bit of the horizontal transfer unit corresponding to the group to which the vertical transfer unit belongs. The solid state imaging device has at least one charge transfer unit corresponding to each of the groups, provided for each of the groups, wherein charges are transferred from the vertical transfer unit to the charge transfer unit corresponding to the group to which the vertical transfer unit belongs, and then from the charge transfer unit to the unit transfer bit of the horizontal transfer unit.

A predetermined number, two or more, of adjacent vertical transfer units are used as one group in correspondence with a unit transfer bit of the horizontal transfer unit, and the vertical transfer unit transfers charges to the corresponding unit transfer bit of the horizontal transfer unit. It is therefore possible to realize compression in the horizontal transfer unit in the horizontal direction.

At least one charge transfer unit is provided for each of the groups, the charge transfer unit corresponding to each group. Charges are transferred from the vertical transfer unit to the charge transfer unit corresponding to the group to which the vertical transfer unit belongs, and then from the charge transfer unit to the unit transfer bit of the horizontal transfer unit. Specifically, charges are transferred from the vertical transfer unit to the charge transfer unit corresponding to the group of the vertical transfer unit, and then from the charge transfer unit to the unit transfer bit corresponding to the vertical transfer unit from which charges were transferred to the charge transfer unit. Therefore, each vertical transfer unit in the group transfers charges to the corresponding unit transfer bit via the charge transfer unit. It is therefore possible to suppress a shift of the positional relation between each vertical transfer unit in the group and the corresponding unit transfer bit.

In the solid state imaging device of the present invention, even if compression in the horizontal direction is performed in the horizontal transfer unit, a shift of a transfer direction of each vertical transfer unit in the group can be suppressed when charges are transferred from the vertical transfer units to the horizontal transfer unit. It is therefore possible to improve controllability of charge transfer from the vertical transfer units to the horizontal transfer unit.

DESCRIPTION OF THE PREFERRED EMBODIMENTS

Embodiments of the present invention will be described hereunder with reference to the accompanying drawings, to facilitate the understanding of the present invention.

Figure 1A:
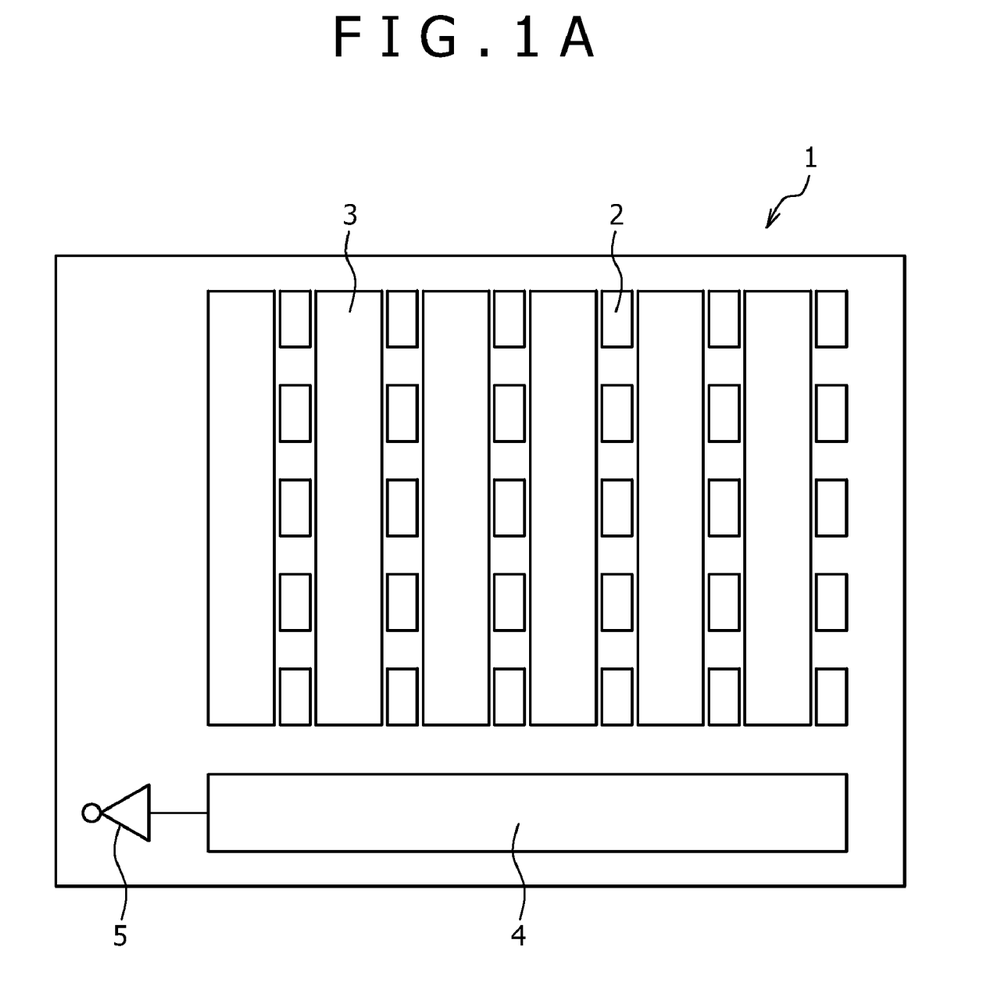
FIG. 1A is a schematic diagram showing an example of a CCD solid state imaging device adopting an embodiment of the present invention.

FIG. 1A is a schematic diagram for explaining an example of a CCD solid state imaging device adopting an embodiment of the present invention. A solid state imaging device 1 shown in FIG. 1 has photo diodes 2 disposed in a matrix shape, vertical transfer units 3 disposed along each vertical column of the photo diodes for transferring signal charges from each photo diode, a horizontal transfer unit 4 for transferring charges transferred from the vertical transfer units in a horizontal direction, and an output unit 5 for outputting charges transferred from the horizontal transfer unit 4 in the form of voltage.

Figure 1B:
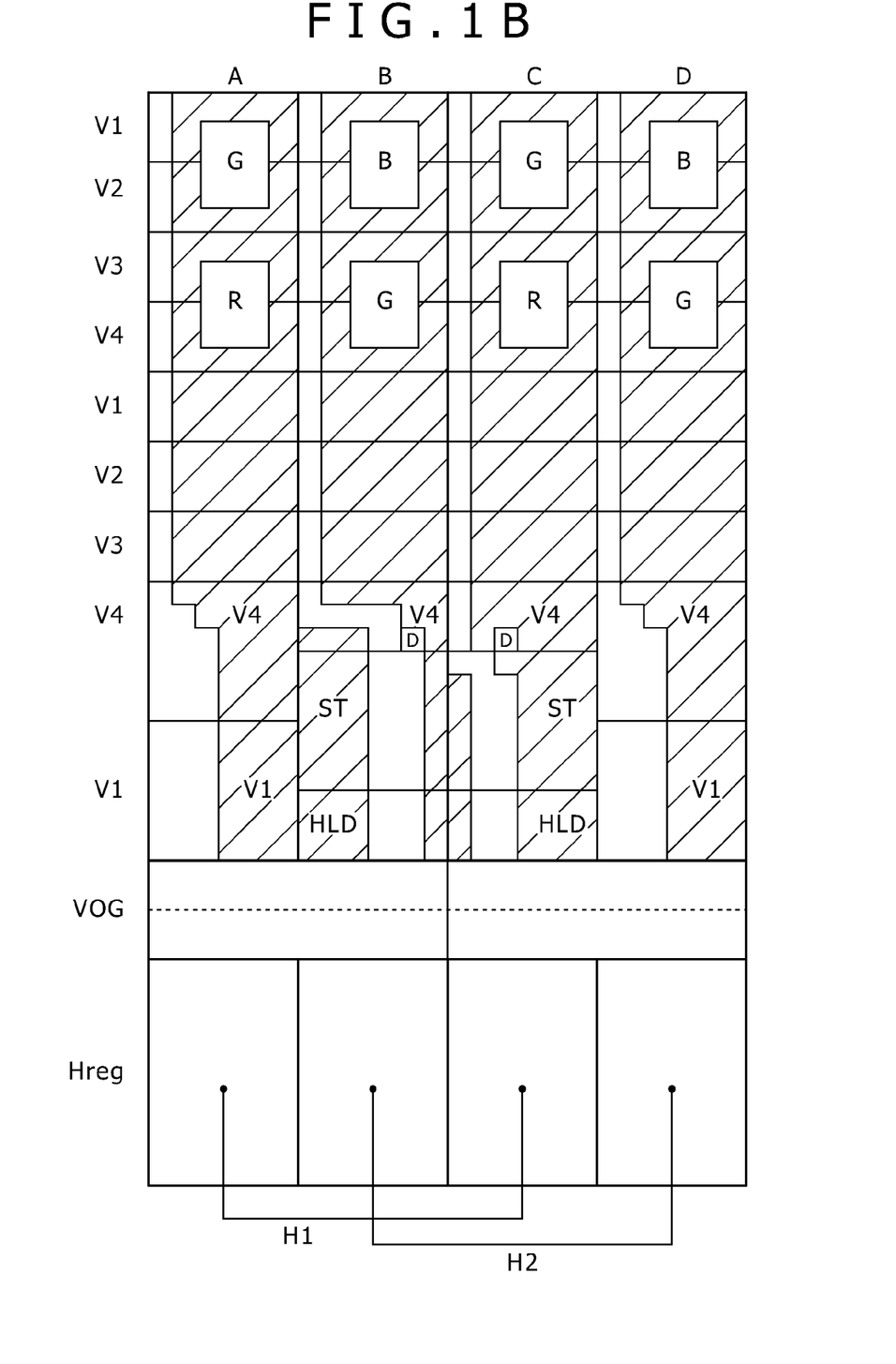
FIG. 1B is a schematic diagram illustrating a drain unit (a region indicated by a symbol D in FIG. 1B) of a CCD solid state imaging device adopting an embodiment of the present invention in which a horizontal transfer unit is driven by two-phase drive and two adjacent vertical transfer units are collectively used as one group.

FIG. 1B is a schematic diagram illustrating a drain unit (a region indicated by a symbol D in FIG. 1B) of a CCD solid state imaging device adopting an embodiment of the present invention, in which a horizontal transfer unit is driven by two-phase drive and two adjacent vertical transfer units are collectively used as one group. A symbol ST which means storage in FIG. 1B represents an ST unit to be described later, and a symbol HL which means hold in FIG. 1B represents an HL unit to be described later. Although the drain unit is not shown, for a case where a drive method of three or more phases is adopted for the horizontal transfer unit and a case where three or more adjacent vertical transfer units are used as one group, the drain unit is similar to that shown in FIG. 1B in that the vertical unit is formed between the charge holding unit D and the vertical transfer unit. The drain unit is coupled to a channel via the ST unit, connected to a light shielding film or the like via an ohmic contact, and finally connected to GND. Signal charges once stored in the ST unit are drained via the channel to the drain unit having a higher electric potential than that of the ST unit, by setting the ST unit and V4 to a bias potential of L. The channel is provided by suppressing conductivity of the ST unit. Specifically, a potential barrier is provided between the ST unit and the drain unit in the channel so that signal charges stored in the ST unit are drained only when necessary. Alternatively, a gate may be provided between the ST unit and the drain unit so that accumulation and drain of charges are controlled.

The light shielding film is a metal light shielding film formed as an upper film of a wiring layer to shield light from a necessary area and generally used for a solid state imaging device. Generally, a fixed voltage is often applied to the metal light shielding film. In this example, from the convenience of wirings, although the structure that signal charges are drained to GND from the light shielding film, it is not necessarily required to drain signal charges via the light shielding film. Any drain may be used if it can drain signal charges, and the drain is not necessarily required to be GND but it is sufficient that the drain has a higher electric potential than that of the ST unit.

Although description will not be given further on the drain in order to avoid redundancy, the drain is provided being connected to the channel, and a charge drain operation is performed by setting the bias potential of the ST unit and preceding stage to L. This is common to all embodiments of the present invention.

First Embodiment

Figure 2A:
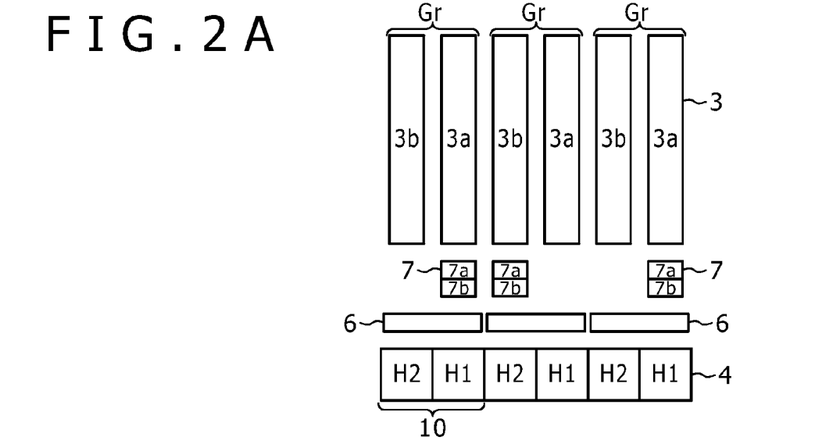
FIGS. 2A to 2C are schematic diagrams illustrating a correspondence between a group constituted of a plurality of vertical transfer units and a unit transfer bit of the horizontal transfer unit.

The horizontal transfer unit is driven by two-phase drive and two adjacent vertical groups are used as one group (refer to FIG. 2A).

In this embodiment, as shown in FIG. 2A, two adjacent vertical transfer units are used as one group Gr, and charge transfer units (VOG unit) 6 corresponding to each group are formed between the horizontal transfer unit and vertical transfer unit. A charge holding unit 7 constituted of a storage unit (ST unit) 7a and a hold unit (HL unit) 7b is formed between one vertical transfer unit of each group and the VOG unit. One group, which is formed of two vertical transfer units, is formed in correspondence with a unit transfer bit 10 of the horizontal transfer unit. For the purposes of simplicity of explanation, a vertical transfer unit for which the charge holding unit is formed is represented by a first vertical transfer unit 3a, and the other vertical transfer unit is represented by a second vertical transfer unit 3b.

Hereinafter, description will be made on following three cases. A case wherein charges are drained to the drain and compression is performed in the horizontal direction, a case wherein charges are not drained to the drain and compression is performed in the horizontal direction, and a case wherein all pixels are read, respectively in the CCD solid state imaging device constructed as above. Symbols "G", "R" and "B" in the accompanying drawings represent "green", "red" and "blue" of color filters.

(1-A) A case wherein charges are drained to the drain and compression is performed in the horizontal direction.

Figure 3A:
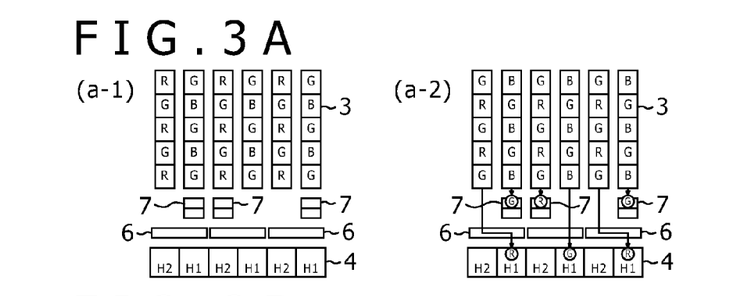
FIGS. 3A to 3C are first schematic diagrams illustrating charge transfer of a CCD solid state imaging device adopting an embodiment of the present invention.

In draining charges to the drain and performing compression in the horizontal direction, as shown in FIG. 3A (a-1), after charges accumulated in the photo diodes are read to the vertical transfer units, the VOG unit, ST unit and H1 are set to a high level (hereinafter called an H level) and the HL unit and H2 are set to a low level (hereinafter called an L level). In this state, the charges read to the vertical transfer units (2) are transferred to the electrodes of the corresponding unit transfer bits applied with H1, by making the vertical transfer units transfer the charges by one bit (refer to FIG. 3A (a-2)). Since the ST unit takes the H level and the HL unit takes the L level, charges (charges read to the first vertical transfer units) to be skipped stay in the ST units. The charges stayed in the ST units are drained to the drains as unnecessary charges.

Next, the charges are transferred in the horizontal transfer unit, so that a first stage of the vertical transfer units can be compressed in the horizontal direction at a compression ratio of ½.

Charges are transferred thereafter in the similar manner, so that the following stages can be compressed in the horizontal direction at a compression ratio of ½.

(1-B) A case wherein charges are not drained to the drain and compression is performed in the horizontal direction.

Figure 3B:
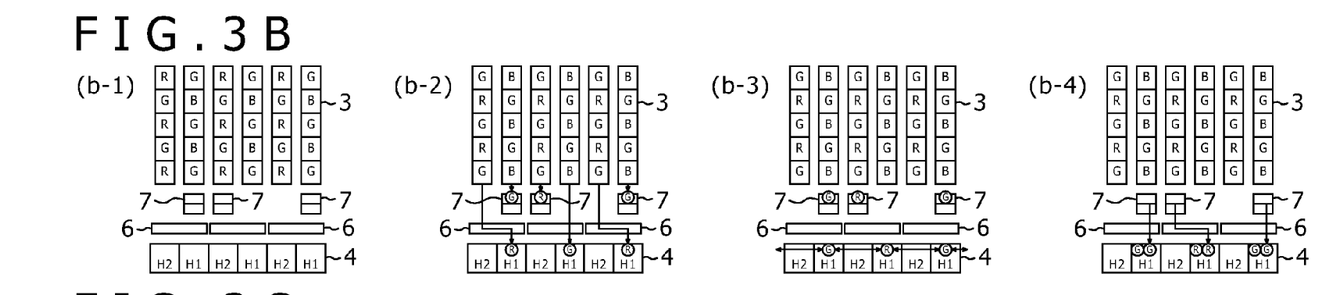

In performing compression in the horizontal direction without draining charges to the drain, as shown in FIG. 3B (b-1), after charges accumulated in the photo diodes are read to the vertical transfer units, the VOG unit, ST unit and H1 are set to the H level and the HL unit and H2 are set to the L level. In this state, the charges read to the vertical transfer units (2) are transferred to the electrodes of the corresponding unit transfer bits applied with H1, by making the vertical transfer units transfer the charges by one bit (refer to FIG. 3B (b-2)).

Next, after the charges read to the horizontal transfer unit are transferred by one bit in the horizontal transfer unit (refer to FIG. 3B (b-3)), the ST unit is changed to the L level from the H level and the HT unit is changed to the H level from the L level. In this state, the charges (charges read to the first vertical transfer units) stayed in the ST units are transferred via the VOG units to the electrodes applied with H1 to perform charge addition in the horizontal transfer unit (refer to FIG. 3B (b-4)).

Next, the charges are transferred in the horizontal transfer unit, so that a first stage of the vertical transfer units can be compressed in the horizontal direction at a compression ratio of ½.

Charges are transferred thereafter in the similar manner, so that the following stages can be compressed in the horizontal direction at a compression ratio of ½.

(1-C) A case wherein all pixels are read.

Figure 3C:
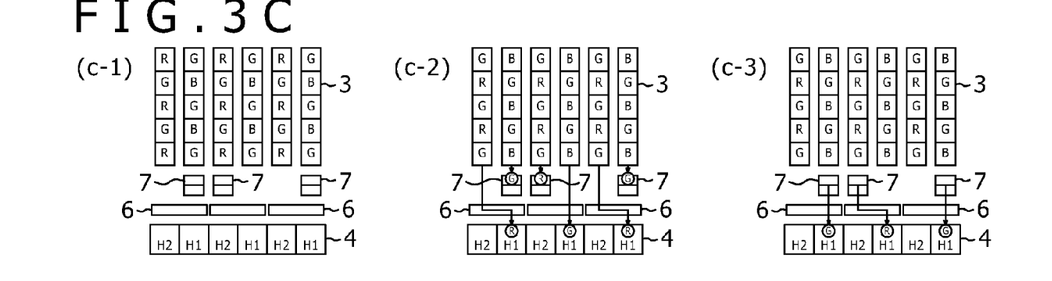

In reading all pixels, as shown in FIG. 3C (c-1), after charges accumulated in the photo diodes are read to the vertical transfer units, the VOG unit, ST unit and H1 are set to the H level and the HL unit and H2 are set to the L level. In this state, the charges read to the vertical transfer units (2) are transferred to the electrodes of the corresponding unit transfer bits applied with H1, by making the vertical transfer units transfer the charges by one bit (refer to FIG. 3C (c-2)).

Thereafter, the charges read to the horizontal transfer unit are transferred in the horizontal transfer unit to output the charges read to the second vertical transfer unit Next, the ST unit is changed to the L level from the H level and the HT unit is changed to the H level from the L level. In this state, the charges (charges read to the first vertical transfer units) stayed in the ST units are transferred to the electrodes applied with H1 (refer to FIG. 3C (c-3)), and thereafter the charges are transferred in the horizontal transfer unit to output the charges read to the first vertical transfer units. In this manner, all pixels in the first stage of the vertical transfer units can be read.

Thereafter, charges are transferred in the similar manner, so that all pixels in the following stages can be read.

Second Embodiment

Figure 2B:
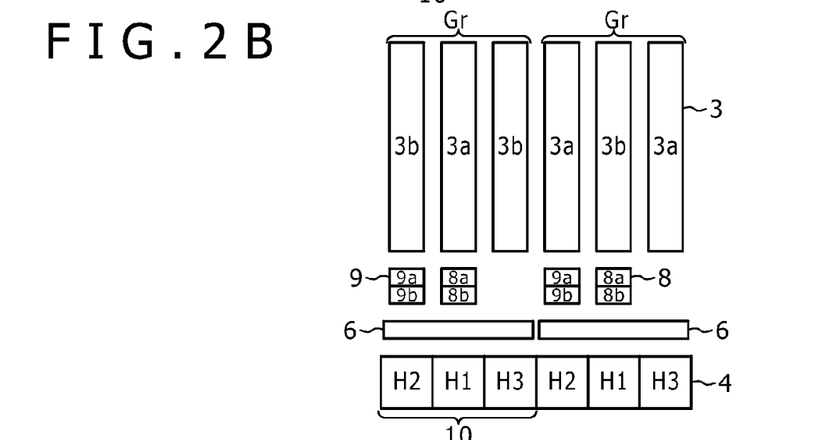

The horizontal transfer unit is driven by three-phase drive and three adjacent vertical groups are used as one group (refer to FIG. 2B).

In this embodiment, as shown in FIG. 2B, three adjacent vertical transfer units are used as one group Gr, and VOG units 6 corresponding to each group are formed between the horizontal transfer unit and vertical transfer unit. A charge holding unit (1) 8 constituted of a storage unit (1) (ST (1) unit) 8a and a hold unit (1) (HL (1) unit) 8b is formed between one vertical transfer unit of each group and the VOG unit. A charge holding unit (2) 9 constituted of a storage unit (2) (ST (2) unit) 9a and a hold unit (2) (HL (2) unit) 9b is formed between another vertical transfer unit of each group and the VOG unit. One group, which is formed of three vertical transfer units, is formed in correspondence with a unit transfer bit 10 of the horizontal transfer unit. For the purposes of simplicity of explanation, a vertical transfer unit for which the charge holding unit (1) is formed is represented by a first vertical transfer unit 3a, a vertical transfer unit for which the charge holding unit (2) is formed is represented by a vertical second transfer unit 3b, and a vertical transfer unit for which the charge holding unit is not formed is represented by a third vertical transfer unit 3c.

Hereinafter, description will be made on following three cases. A case wherein charges are drained to the drain and compression is performed in the horizontal direction, a case wherein charges are not drained to the drain and compression is performed in the horizontal direction, and a case wherein all pixels are read, respectively in the CCD solid state imaging device constructed as above.

(2-A) A case wherein charges are drained to the drain and compression is performed in the horizontal direction.

Figure 4A:
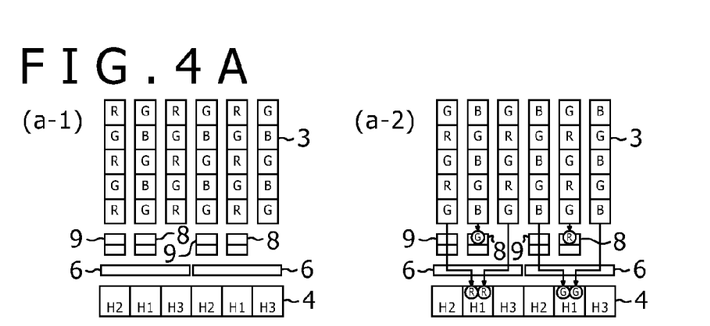
FIGS. 4A to 4C are second schematic diagrams illustrating charge transfer of a CCD solid state imaging device adopting an embodiment of the present invention.

In draining charges to the drain and performing compression in the horizontal direction, as shown in FIG. 4A (a-1), after charges accumulated in the photo diodes are read to the vertical transfer units, the VOG unit, ST (1) unit, ST (2) unit, HL (2) unit and H1 are set to the H level, and the HL (1) unit, H2 and H3 are set to the L level. In this state, the charges read to the vertical transfer units (2) and vertical transfer units (3) are transferred to the electrodes of the corresponding unit transfer bits applied with H1, by making the vertical transfer units transfer the charges by one bit (refer to FIG. 4A (a-2)). Since the ST unit (1) takes the H level and the HL (1) unit takes the L level, charges, which are read to the vertical transfer units (1), to be skipped stay in the ST (1) units. The charges stayed in the ST (1) units are drained to the drains as unnecessary charges.

Next, the charges are transferred in the horizontal transfer unit, so that a first stage of the vertical transfer units can be compressed in the horizontal direction at a compression ratio of ⅓.

Charges are transferred thereafter in the similar manner, so that the following stages can be compressed in the horizontal direction at a compression ratio of ⅓.

(2-B) A case wherein charges are not drained to the drain and compression is performed in the horizontal direction.

Figure 4B:
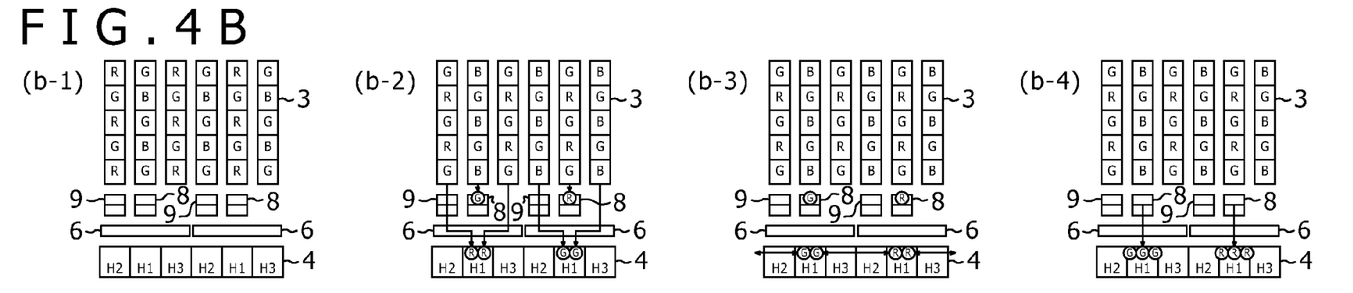

In performing compression in the horizontal direction without draining charges to the drain, as shown in FIG. 4B (b-1), after charges accumulated in the photo diodes are read to the vertical transfer units, the VOG unit, ST (1) unit, ST (2) unit, HL (2) unit and H1 are set to the H level, and the HL (1) unit, H2 and H3 are set to the L level. In this state, the charges read to the vertical transfer units (2) and vertical transfer units (3) are transferred to the electrodes of the corresponding unit transfer bits applied with H1, by making the vertical transfer units transfer the charges by one bit (refer to FIG. 4B (b-2)).

Next, after the charges read to the horizontal transfer unit are transferred by one bit (refer to FIG. 4B (b-3)), the ST (1) unit is changed to the L level from the H level and the HT (1) unit is changed to the H level from the L level. In this state, the charges, which are read to the vertical transfer units (1), stayed in the ST units are transferred via the VOG units to the electrodes applied with H1 to perform charge addition in the horizontal transfer unit (refer to FIG. 4B (b-4)).

Next, the charges are transferred in the horizontal transfer unit, so that a first stage of the vertical transfer units can be compressed in the horizontal direction at a compression ratio of ⅓.

Charges are transferred thereafter in the similar manner, so that the following stages can be compressed in the horizontal direction at a compression ratio of ⅓.

(2-C) A case wherein all pixels are read.

Figure 4C:
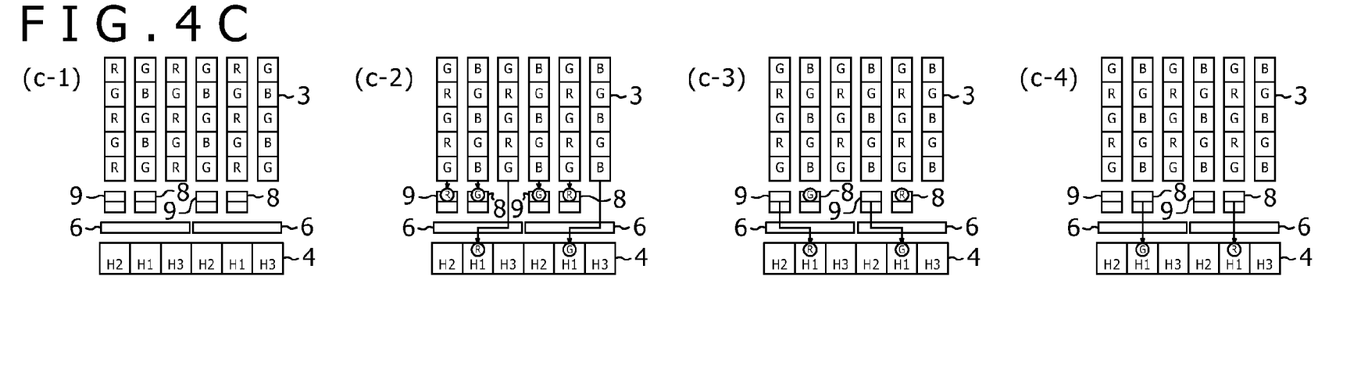

In reading all pixels, as shown in FIG. 4C (c-1), after charges accumulated in the photo diodes are read to the vertical transfer units, the VOG unit, ST (1) unit, ST (2) unit and H1 are set to the H level and the HL (1) unit, HL (2) unit, H2 and H3 are set to the L level. In this state, the charges read to the vertical transfer units (3) are transferred to the electrodes of the corresponding unit transfer bits applied with H1, by making the vertical transfer units transfer the charges by one bit (refer to FIG. 4C (c-2)). Thereafter, the charges are transferred in the horizontal transfer unit to output the charges read to the third vertical transfer unit.

Next, the ST (2) unit is changed to the L level from the H level and the HT (2) unit is changed to the H level from the L level. In this state, the charges stayed in the ST (2) units are transferred to the electrodes applied with H1 (refer to FIG. 4C (c-3)), and thereafter the charges are transferred in the horizontal transfer unit to output the charges read to the vertical transfer units (2).

Next, the ST (1) unit is changed to the L level from the H level and the HT (1) unit is changed to the H level from the L level. In this state, the charges stayed in the ST (1) units are transferred to the electrodes applied with H1 (refer to FIG. 4C (c-4)), and thereafter the charges are transferred in the horizontal transfer unit to output the charges read to the vertical transfer units (1). In this manner, all pixels in the first stage of the vertical transfer units can be read.

Thereafter, charges are transferred in the similar manner, so that all pixels in the following stages can be read.

Third Embodiment

Figure 2C:
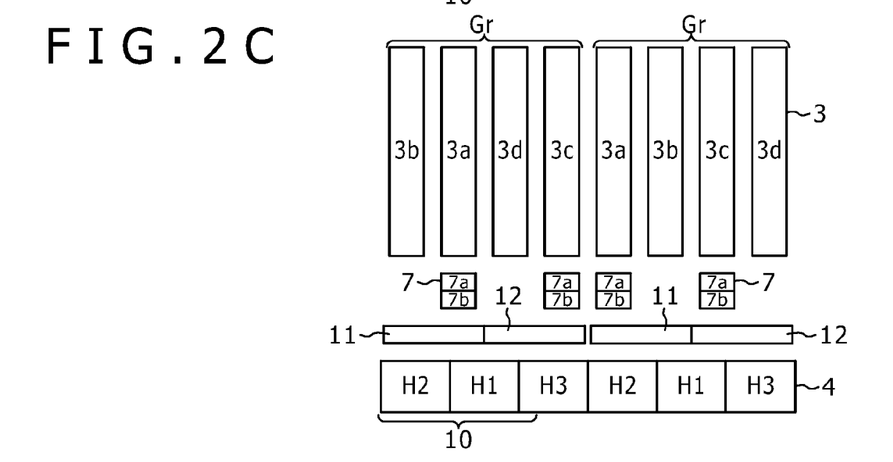

The horizontal transfer unit is driven by three-phase drive and four adjacent vertical groups are used as one group (refer to FIG. 2C).

In this embodiment, as shown in FIG. 2C, four adjacent vertical transfer units, which are first vertical transfer unit 3a, second vertical transfer unit 3b, third vertical transfer unit 3c and forth vertical transfer unit 3d, are used as one group Gr, and VOG units corresponding to each group are formed between the horizontal transfer unit and vertical transfer unit. The VOG unit is constituted of a VOG unit (1) 11 corresponding to the first vertical transfer unit and second vertical transfer unit and a VOG unit (2) 12 corresponding to the third vertical transfer unit and forth vertical transfer unit. A charge holding unit 7 constituted of an ST unit and an HL unit is formed between the first vertical transfer unit and VOG unit (1) and between the third vertical transfer unit and VOG unit (2). One group, which is formed of four vertical transfer units, is formed in correspondence with a unit transfer bit 10 of the horizontal transfer unit.

Hereinafter, description will be made on following three cases. A case wherein charges are drained to the drain and compression is performed in the horizontal direction, a case wherein charges are not drained to the drain and compression is performed in the horizontal direction, and a case wherein all pixels are read, respectively in the CCD solid state imaging device constructed as above.

(3-A) A case wherein charges are drained to the drain and compression is performed in the horizontal direction.

Figure 5A:
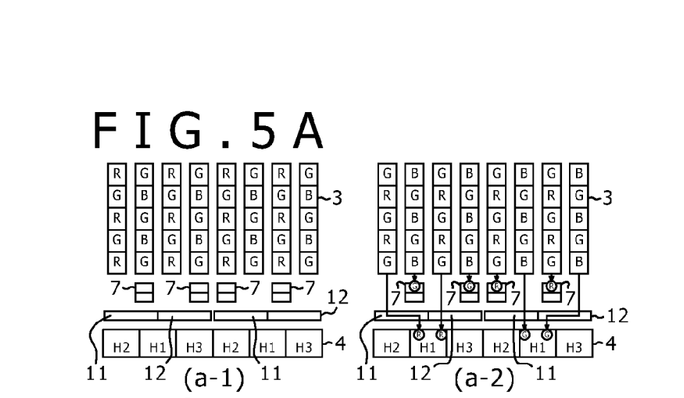
FIGS. 5A to 5C are third schematic diagrams illustrating charge transfer of a CCD solid state imaging device adopting an embodiment of the present invention.

In draining charges to the drain and performing compression in the horizontal direction, as shown in FIG. 5A (a-1), after charges accumulated in the photo diodes are read to the vertical transfer units, the VOG unit (1), VOG unit (2), ST unit and H1 are set to the H level, and the HL unit and H2 and H3 are set to the L level. In this state, the charges read to the vertical transfer units (2) and vertical transfer units (4) are transferred to the electrodes of the corresponding unit transfer bits applied with H1, by making the vertical transfer units transfer the charges by one bit (refer to FIG. 5A (a-2)). Since the ST unit takes the H level and the HL unit takes the L level, charges (charges read to the vertical transfer units (1) and vertical transfer units (3)) to be skipped stay in the ST units. The charges stayed in the ST units are drained to the drains as unnecessary charges.

Next, the charges are transferred in the horizontal transfer unit, so that a first stage of the vertical transfer units can be compressed in the horizontal direction at a compression ratio of ½.

(3-B) A case wherein charges are not drained to the drain and compression is performed in the horizontal direction.

Figure 5B:
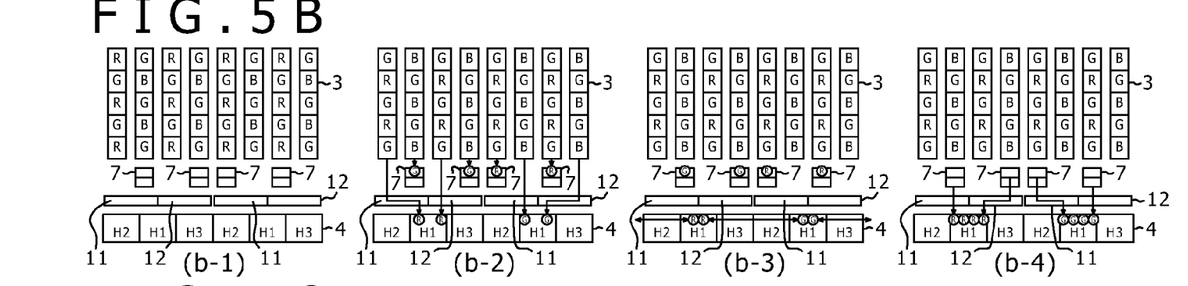

In performing compression in the horizontal direction without draining charges to the drain, as shown in FIG. 5B (b-1), after charges accumulated in the photo diodes are read to the vertical transfer units, the VOG unit (1), VOG unit (2), ST unit and H1 are set to the H level and the HL unit, H2 and H3 are set to the L level. In this state, the charges read to the vertical transfer units (2) and vertical transfer units (4) are transferred to the electrodes of the corresponding unit transfer bits applied with H1, by making the vertical transfer units transfer the charges by one bit (refer to FIG. 5B (b-2)).

Next, after the charges read to the horizontal transfer unit are transferred by one bit in the horizontal direction (refer to FIG. 5B (b-3)), the ST unit is changed to the L level from the H level and the HT unit is changed to the H level from the L level. In this state, the charges, which are read to the vertical transfer units (1) and vertical transfer units (3), stayed in the ST units are transferred via the VOG units (1) or VOG units (2) to the electrodes applied with H1 to perform charge addition in the horizontal transfer unit (refer to FIG. 5B (b-4)).

Next, the charges are transferred in the horizontal transfer unit, so that a first stage of the vertical transfer units can be compressed in the horizontal direction at a compression ratio of ½.

Charges are transferred thereafter in the similar manner, so that the following stages can be compressed in the horizontal direction at a compression ratio of ½.

(3-C) A case wherein all pixels are read.

Figure 5C:
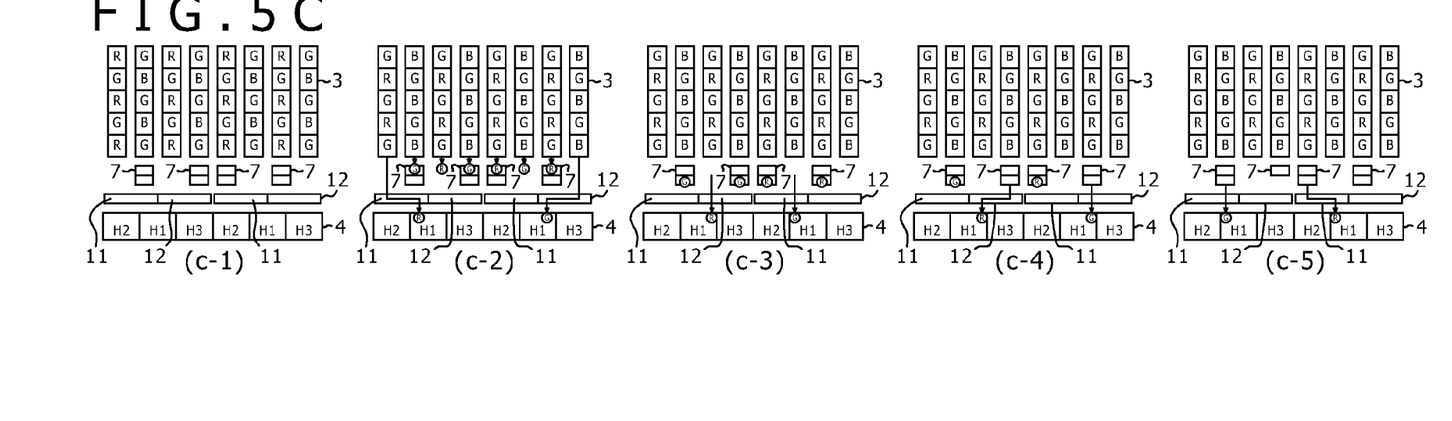

In reading all pixels, as shown in FIG. 5C (c-1), after charges accumulated in the photo diodes are read to the vertical transfer units, the VOG unit (1), ST unit, and H1 are set to the H level and the VOG unit (2), HL unit, H2 and H3 are set to the L level. In this state, the charges read to the vertical transfer units (2) are transferred to the electrodes of the corresponding unit transfer bits applied with H1, by making the vertical transfer units transfer the charges by one bit (refer to FIG. 5C (c-2)). Thereafter, the charges are transferred in the horizontal transfer unit to output the charges read to the second vertical transfer unit.

Next, the VOG unit (1) is changed to the L level from the H level and the VOG unit (2) is changed to the H level from the L level. In this state, the charges read to the vertical transfer units (4) are transferred to the electrodes of the corresponding unit transfer bits applied with H1, by making the vertical transfer units transfer the charges by one bit (refer to FIG. 5C (c-3)). Thereafter, the charges are transferred in the horizontal transfer unit to output the charges read to the forth vertical transfer unit.

Next, the ST is changed to the L level from the H level and the HT unit is changed to the H level from the L level. In this state, the charges transferred from the vertical transfer units (3) and stayed in the ST units are transferred to the electrodes applied with H1, whereas the charges transferred from the vertical transfer units (1) and stayed in the ST units are transferred to the HL units (refer to FIG. 5C (c-4)), and thereafter the charges are transferred in the horizontal transfer unit to output the charges read to the vertical transfer units (3).

Next, the VOG unit (1) is changed to the H level from the L level and the VOG unit (2) is changed to the L level from the H level. In this state, the charges stayed in the HL units are transferred to the electrodes applied with H1 (refer to FIG. 5C (c-5)), and thereafter the charges are transferred in the horizontal transfer unit to output the charges read to the vertical transfer units (1). In this manner, all pixels in the first stage of the vertical transfer units can be read.

Thereafter, charges are transferred in the similar manner, so that all pixels in the following stages can be read.

In the CCD solid state imaging device to which the above-described invention is applied, charges to be transferred from the vertical transfer units to the horizontal transfer unit a retransferred via the VOG units. Specifically, charges are transferred from the vertical transfer units to the VOG units, and then from the VOG units to the horizontal transfer unit.

More specifically, in the first and second embodiments, the positional relation between each vertical transfer unit and the VOG unit to which charges are transferred is the same. Therefore, each vertical transfer unit can transfer charges to the VOG unit in the same direction. Further, the positional relation between each VOG unit and the horizontal transfer unit to which charges are transferred is the same. Therefore, each VOG unit can transfer charges to the horizontal transfer unit in the same direction.

In the third embodiment, since charges are transferred via the VOG unit (1) or VOG unit (2), a shift of a charge transfer direction of each vertical transfer unit in the same group can be suppressed.

Sufficient charge transfer control is therefore possible from the vertical transfer units to the horizontal transfer unit.

The charge holding unit is provided to make different the path for transferring charges from each vertical transfer unit in the same group to the corresponding unit transfer bit. It is therefore possible to apply the present invention to a drive method of reading all pixels without performing compression in the horizontal direction ( ).

More specifically, in the first embodiment, the first vertical transfer unit transfers charges to the corresponding unit transfer bit via the charge holding unit and VOG unit, whereas the second vertical transfer unit transfers charges to the corresponding unit transfer bit via only the VOG unit, to thereby make different the paths of the first vertical transfer unit and second vertical transfer unit transferring charges to the corresponding unit transfer bit. In the second embodiment, the first vertical transfer unit transfers charges to the corresponding unit transfer bit via the charge holding unit (1) and VOG unit, the second vertical transfer unit transfers charges to the corresponding unit transfer bit via the charge holding unit (2) and VOG unit, and the third vertical transfer unit transfers charges to the corresponding unit transfer bit via only the VOG unit, to thereby make different the paths of the first vertical transfer unit, second vertical transfer unit and third vertical transfer unit transferring charges to the corresponding unit transfer bit. In the third embodiment, the first vertical transfer unit transfers charges to the corresponding unit transfer bit via the charge holding unit and VOG unit (1), the second vertical transfer unit transfers charges to the corresponding unit transfer bit via only the VOG unit (1), the third vertical transfer unit transfers charges to the corresponding unit transfer bit via the charge holding unit and VOG unit (2), and the forth vertical transfer unit transfers charges to the corresponding unit transfer bit via only the VOG unit (2), to thereby make different the paths of the first vertical transfer unit, second vertical transfer unit, third vertical transfer unit and forth vertical transfer unit transferring charges to the corresponding unit transfer bit. It is therefore possible to apply the present invention to a drive method reading all pixels.

It should be understood by those skilled in the art that various modifications, combinations, sub-combinations and alterations may occur depending on design requirements and other factors insofar as they are within the scope of the appended claims or the equivalents thereof.

The present invention contains subject matter related to Japanese Patent Application JP2005-133415, filed in the Japanese Patent Office on Apr. 28, 2005, the entire contents of which being incorporated herein by reference.

What is claimed is:

1. A solid state imaging device comprising:
   a plurality of photo diodes disposed in a matrix shape;
   a vertical transfer unit disposed along each vertical column of the photo diodes; and
   a horizontal transfer unit in which a predetermined number, two or more, of adjacent vertical transfer units are used as one group to correspond to a unit transfer bit,
   wherein,
   at least one charge transfer unit corresponding to each group of the vertical transfer unit is provided for each group, and
   at least one charge holding unit is provided between the vertical transfer units for each group of the vertical transfer unit.

2. A method of driving a solid state imaging device having
   (a) a plurality of photo diodes disposed in a matrix shape;
   (b) a vertical transfer unit disposed along each vertical column of the photo diodes;
   (c) a horizontal transfer unit in which a predetermined number, two or more, of adjacent vertical transfer units are used as one group to correspond to a unit transfer bit; and (d) at least one charge transfer unit corresponding to each group of the vertical transfer unit is provided for each group, the driving method comprising the steps of:

(i) transferring charges from the vertical transfer unit in the group to the charge transfer unit corresponding to the group to which the vertical transfer unit belongs, and (ii) transferring charges from the charge transfer unit to the unit transfer bit of the horizontal transfer unit, wherein, a charge holding unit corresponding to the vertical transfer unit is provided in at least one vertical transfer unit in the group, charges are transferred from the vertical transfer unit to the charge holding unit, and further transferred from the charge holding unit to the charge transfer unit, as transfer paths for transfer of charges, there are a first transfer path through which charges are transferred from at least one of the vertical transfer units in the group to the charge transfer unit, and further transferred from the charge transfer unit to the horizontal transfer unit, and a second transfer path through which charges are transferred from other vertical transfer unit to the charge holding unit, and further transferred from charge holding unit to the charge transfer unit, and then further transferred from the charge transfer unit to the horizontal transfer unit;

in the second transfer path, signal charges transferred to the horizontal transfer unit through the first transfer path is horizontally transferred an amount corresponding to the unit transfer bit during charge being held at the charge holding unit, and then charges in the second transfer path is transferred from the charge transfer unit to the horizontal transfer unit.

3. The driving method for a solid state imaging device, according to claim 2, wherein each of at least a portion of the plurality of photo diodes has a color filter, and the plurality of photo diodes horizontally transfer charges transferred to the horizontal transfer unit through the first transfer path an amount corresponding to the unit transfer bit during charges being held at the charge holding unit in the second transfer path, and then transfer signal charges in the second transfer path from the charge transfer unit to the horizontal transfer unit to mix charges of a same color.

4. A camera using a solid state imaging device, the solid state imaging device comprising:

a plurality of photo diodes disposed in a matrix shape;

a vertical transfer unit disposed along each vertical column of the photo diodes;

a horizontal transfer unit in which a predetermined number, two or more, of adjacent vertical transfer units are used as one group to correspond to a unit transfer bit; and a charge holding unit corresponding to the vertical transfer unit provided in at least one vertical transfer unit in the group, wherein, charges are transferred from the vertical transfer unit to the charge holding unit, and further transferred from the charge holding unit to the charge transfer unit, as transfer paths for transfer of charges, there are (a) a first transfer path through which charges are transferred from at least one of the vertical transfer units in the group to the charge transfer unit, and further transferred from the charge transfer unit to the horizontal transfer unit, and (b) a second transfer path through which charges are transferred from other vertical transfer unit to the charge holding unit, and further transferred from charge holding unit to the charge transfer unit, and then further transferred from the charge transfer unit to the horizontal transfer unit, at least one charge transfer unit corresponding to each group of the vertical transfer unit is provided for each group, at least one charge holding unit is provided between the vertical transfer units for each group of the vertical transfer unit, and each of at least a portion of the plurality of photo diodes has a color filter, respectively, and the plurality of photo diodes horizontally transfer charges transferred to the horizontal transfer unit through the first transfer path an amount corresponding to the unit transfer bit during charges being held at the charge holding unit in the second transfer path, and then transfer signal charges in the second transfer path from the charge transfer unit to the horizontal transfer unit to mix charges of a same color.

* * * * *